Patented May 27, 1930

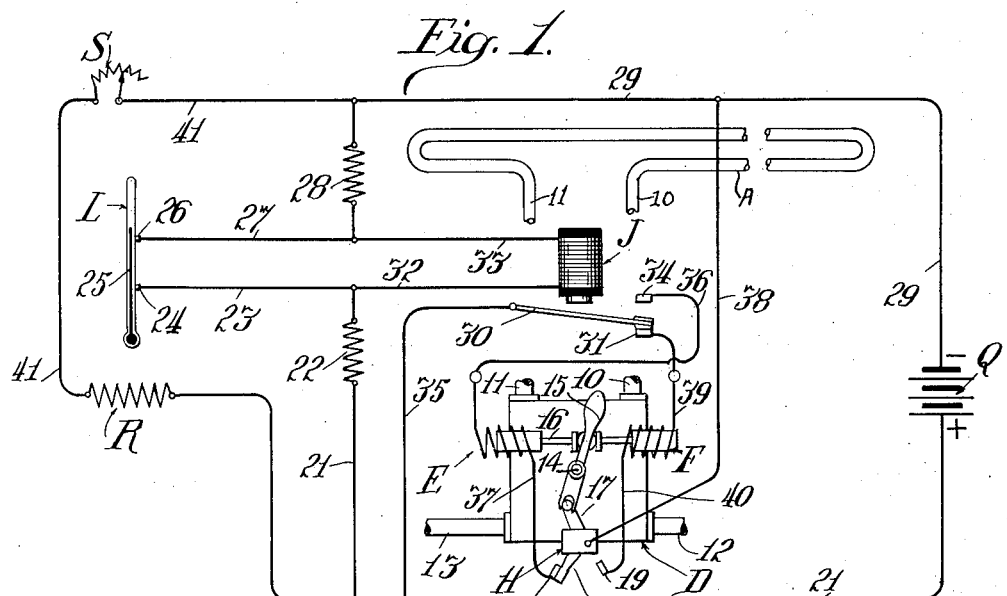
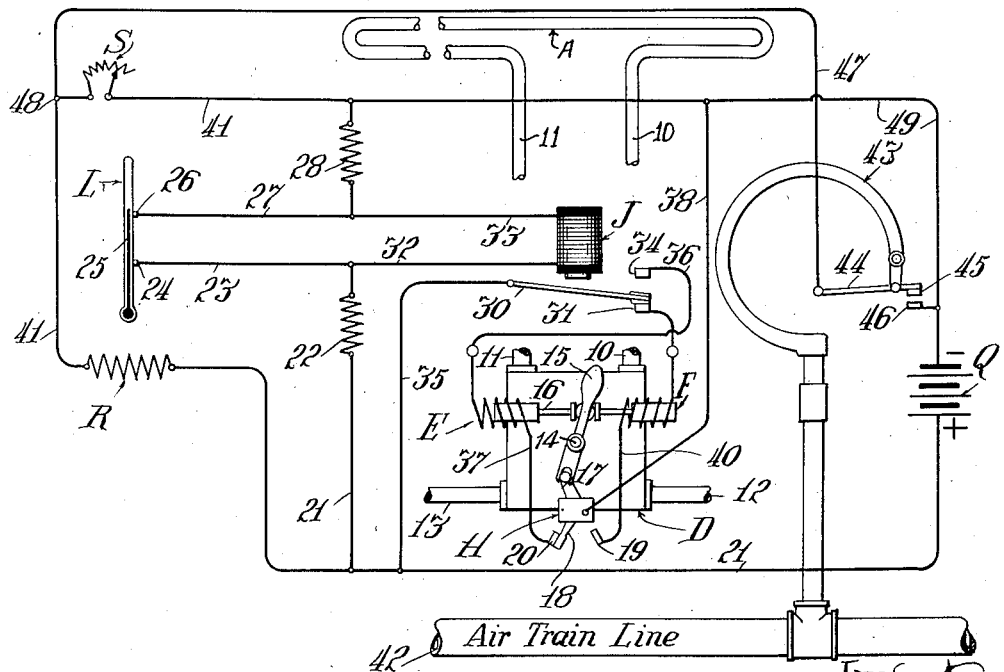

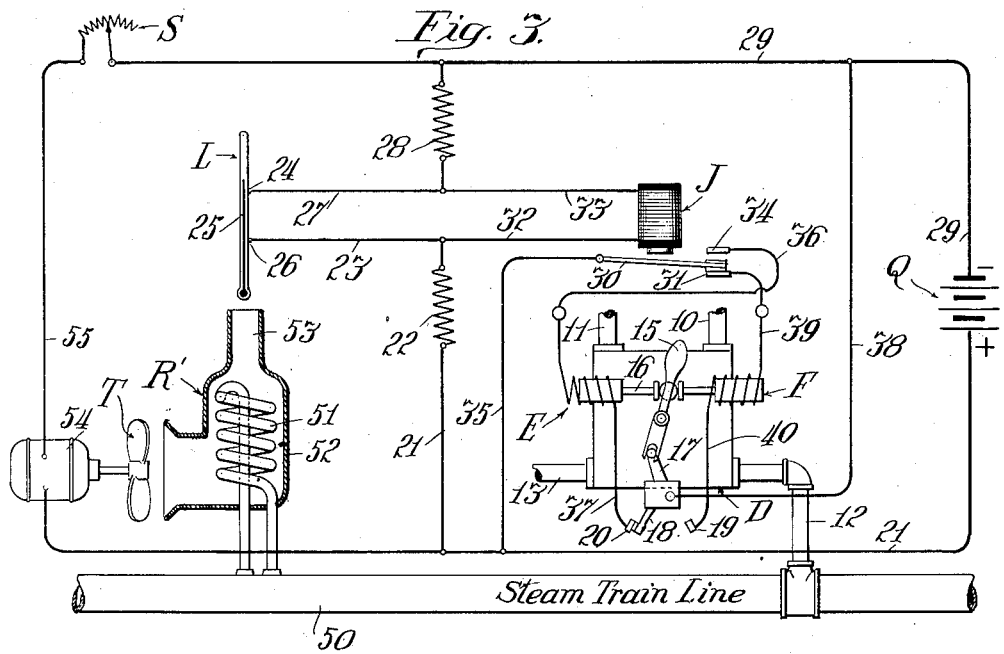
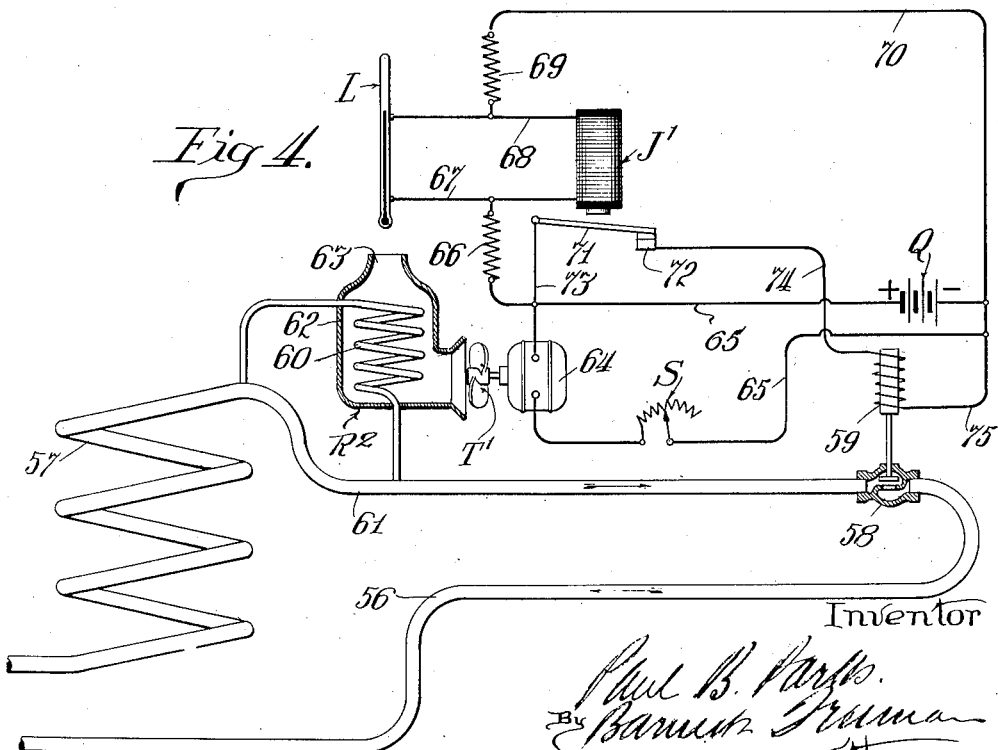

1,760,081

UNITED STATES PATENT OFFICE

PAUL B. PARKS, OF OAK PARK, ILLINOIS, ASSIGNOR TO VAPOR CAR HEATING COMPANY, INC., OF CHICAGO, ILLINOIS, A CORPORATION OF NEW YORK

THERMOSTAT CONTROL

Application filed June 18, 1927. Serial No. 199,715.

My invention relates to thermostatic mechanism for controlling heating systems, refrigerating systems, or any other apparatus designed to be controlled or its operation started, stopped or varied in response to temperature changes; and the object of the invention is to provide means whereby the functioning of the thermostat may be varied, without actual adjustment of any part thereof, by raising or lowering by a controllable and predetermined amount the temperature of the air or other fluid in the immediate vicinity of the thermostat, for example, the temperature of the atmosphere surrounding and in proximity to the thermally responsive part of the instrument. The invention may be utilized with a mercury tube electric circuit controlling thermostat, in which connection the invention has particular utility because of the great difficulty in adjusting the thermostat itself for response to different temperatures; or it may be utilized with any other type of thermostat or thermally responsive instrument. The means for regulatably affecting the environing atmosphere of the thermostat may be an electric resistance heater regulated by a rheostat or any other suitable type of heating or cooling device. I have illustrated in the appended drawings the application of the invention to several different types of thermostatically controlled apparatus. Other uses will readily suggest themselves to those familiar with thermally controlled apparatuses, so that I desire to be understood as claiming all uses to which the invention may be put together with all modifications of the apparatuses shown and all embodiments of the invention within the scope of the claims hereof.

In the drawings,

Fig. 1 is a diagrammatic view illustrating the application of the invention to a thermostatically controlled steam heating system.

Fig. 2 is a similar view illustrating the application of the invention to a heating system adapted to be controlled, selectively, so as to maintain, under different conditions, either a high or a low temperature.

Fig. 3 is a diagram illustrating utilization of the invention with a heating system in which an indirect steam heater is employed for regulating the controlling thermostat of the system, and Fig. 4 is a diagram illustrating the application of the invention to a refrigerating system.

Referring first to Fig. 1: 10 and 11 designate the inlet and return pipes of a radiator A, for example the heating coil of a railway car, and 12 and 13 the supply and discharge pipes; these pipes being shown as connected with the casing of a four-way valve D, the valve member of which is fastened to a spindle 14, operated by a lever 15 engaged with the double core structure 16 of a pair of solenoids E and F, E being the valve opening solenoid and F the valve closing solenoid. J is a relay for switching the current as between solenoids E and F and L is a thermostat, shown as a mercury column type of thermostat which by making and breaking a circuit brings about the short circuiting or energization of the relay J. Q is a battery or other source of supply of current, R is an electric resistance heater arranged close to, preferably under the thermostat L and S is a rheostat for varying the heating capacity of heater R. H is a snap switch operated by a link 17 connected with the lever 15 of valve D for braking the circuit through the solenoid E or F as the case may be, at the end of the valve movement, this snap switch comprising an oscillating lever 18 operating against contacts 19 and 20.

The operation of the system as above described is as follows: With the parts of the apparatus in the positions shown the heating system is at or above the temperature at which the thermostat L functions to close the circuit which it controls. Valve D is therefore closed. The circuit through the thermostat is as follows:

*Circuit No. 1.*—Battery Q, wire 21, resistance 22, wire 23, lower contact 24 of the thermostat L, mercury column 25 of the thermostat, upper contact 26 of the thermostat, wire 27, resistance 28 and wire 29 to the battery.

The resistance of the relay being greater than the resistance through the thermostat, the relay is effectively short circuited and the armature 30 is on the lower contact 31.

When the mercury column 25 of the thermostat by descending moves out of contact with the contact 26, the circuit just traced is broken, resulting in the energization, over wires 32, 33 of the relay J which attracts this armature 30 against contact 34. A circuit is now closed through solenoid E which opens the radiator valve D to admit steam to the radiator, the room temperature being below that which the thermostat L is designed to maintain. This circuit is as follows:

*Circuit No. 2.*—Battery Q, wire 21, wire 35, armature 30, contact 34, wire 36, solenoid E, wire 37, contact 20, snap switch lever 18, wire 38 and wire 29 to the battery. Solenoid E is energized moving the core member 16 to the left and opening valve D. As soon as the valve movement is completed arm 18 is thrown over upon contact 19 breaking the circuit through solenoid E.

When the temperature in the room rises to the point at which the mercury column 25 of thermostat L touches contact 26, a circuit is completed through the closing solenoid F, due to the short circuiting of relay J, as follows:

*Circuit No. 3.*—Battery Q, wires 21 and 35, armature 30, contact 31, wire 39, solenoid F, wire 40, contact 19, snap switch arm 18, and wires 38 and 29 to the battery.

The heater R and its rheostat S are arranged in a shunt circuit 41 from circuit No. 1. By manipulation of the rheostat, the amount of heat applied by heater R to thermostat L may be varied. In this way the operation of the thermostat may be varied which is advantageous for several reasons: The thermostat in this way can be influenced, regulatably, so that any desired temperature may be maintained in the apartment being heated. For example, a low temperature at night and a higher temperature in the daytime, without any adjustment of the thermostat itself; less care need be taken in the manufacture of the thermostat, since the rheostat may be set to compensate for any inaccuracy in the placing of the upper contact 26 of the thermostat; and, finally, under all conditions a circulation of air is maintained past the thermostat which gives it a quicker and more accurate response to temperature changes in the room.

In Fig. 2 the invention is adapted for automatically maintaining the heat in the apartment either at a high temperature or at a low temperature, according to conditions. Specifically this figure shows the application of the invention to a railway car heating system intended to maintain the high temperature in the car when the car is in service and connected with the locomotive, and to maintain the low temperature when the car is cut off from the locomotive and is receiving heating medium from the steam line in the railway yard.

The system of Fig. 2 has all of the instrumentalities shown in Fig. 1, the reference characters being the same in both figures in respect to these parts, and certain other devices as follows: 42 is one of the air train lines of the car, the signal line, for example. This pipe is under air pressure while the car is connected up with the locomotive. When the car is disconnected from the locomotive, the air pressure in pipe 42 is dissipated. 43 is a pressure actuated device, preferably a Bourdon tube mechanism for operating a switch arm 44 adapted to cause the engagement of a pair of contacts 45, 46. In the drawing switch arm 44 has moved contact 45 out of contact with contact 46. Contact 45 is connected by wire 47 with wire 41 at a point 48 whereby with current flowing over wire 47 the rheostat is short circuited. Wire 49 connects contact 46 with wire 41. With the parts as shown in the drawing the circuit containing contacts 45, 46 is open, so that current to control the system must pass through the rheostat S. With the rheostat adjusted so that most of its resistance is cut in the heater R will receive but a small amount of current and have a correspondingly small effect on the thermostat L. Therefore the car temperature will have to be relatively high, say at 70° Fahrenheit, before the mercury column 25 will reach the upper contact 26 of the thermostat. The car is in service, connected up with the locomotive, and consequently the air train line 42 is under high pressure so that the Bourdon tube 43 is expanded and contact arm 44 has moved contact 45 out of contact with the contact 46.

When the car goes out of service and stands in the train yard with its steam train pipe connected up with the yard steam line, the pressure in air train pipe 42 will be at atmosphere and the contraction of the Bourdon tube 43 will move arm 44 to bring contacts 45, 46 together. This short circuits the rheostat S so that heater R operates at full capacity. As a result a lower temperature of the car atmosphere as a whole will be required for keeping the mercury column in contact with contact 26, so that the temperature in the car will be maintained at a lower point than when the car is in service. By setting the contact 26 at the proper point having reference to the amount of heat delivered by the heater R at full capacity, the apparatus may be designed for maintaining the car at any relatively low temperature, for example at a temperature of 50° Fahrenheit when the rheostat is short circuited. When the car is in service any higher temperature may be maintained by an adjustment of the rheostat.

In Fig. 3 a heating system is shown corresponding to that illustrated in Fig. 1 except that the heater R' for the thermostat is an indirect steam heater, the effect of which on the thermostat is varied by varying the operation of a fan T. 50 designates the steam train pipe of the car and 51 a coil connected at both ends with pipe 50 and enclosed in a housing 52 having an opening or chimney 53 directly under the thermostat L. The motor 54 for the fan T is in a shunt circuit 55, corresponding to shunt circuit 41 of Fig. 1, and in this circuit is arranged the rheostat S. By varying the amount of current supplied to the fan motor the delivery of heat to the thermostat L may be varied.

In Fig. 4 I have shown the application of the invention to a refrigerating system. 56 designates the refrigerating pipe and 57 the condensing coil. 58 is a valve controlled by solenoid 59 for governing the inflow of cooling medium to the refrigerating pipe 56. $R^2$ is a cooling device for the thermostat L consisting of a coil 60 tapped off from the pipe 61 in which valve 58 is located and preferably arranged in a housing 62 having a chimney 63 directly below thermostat L. T' is a fan arranged to blow air through housing 62. The closing of the circuit through thermostat L short circuits the relay J' so as to close the circuit through solenoid 59. A constantly closed shunt contains the motor 64 of fan T' and the rheostat S. The circuit through the relay is as follows:

*Circuit No. 4.*—Battery Q, wire 65, resistance 66, wire 67, thermostat L, wire 68, resistance 69, wire 70 to the battery. This circuit is shown as closed at the thermostat, consequently the armature 71 of the relay is on contact 72 closing a circuit through the solenoid 59 as follows:

*Circuit No. 5.*—Wire 65, wire 73, armature 71, contact 72, wire 74, solenoid 59, wire 75 to the battery. This opens the valve 58 admitting cooling fluid to the refrigerating pipe 56. When the temperature in the car has been sufficiently cooled so that the circuit is broken through thermostat L, relay J' is energized, breaking the circuit through the solenoid 59 so as to close valve 58. The operation of the thermostat is varied by adjusting the rheostat S so that more or less cold air is blown directly against the thermostat by action of the fan T', the temperature of coil 60 being, it is assumed, below the temperature at which thermostat L is designed to make its circuit.

I claim:

1. In a heating system, a radiator, a valve to govern the supply of heating medium thereto, a thermostat directly responsive to temperature changes in the space to be heated to control the valve and means for continuously applying regulatable quantities of additional heat directly to the thermostat.

2. In a heating system, a radiator, a valve to govern the supply of heating medium thereto, a thermostat directly responsive to temperature changes in the space to be heated to control the valve, an auxiliary heater arranged adjacent the thermostat and means independent of the thermostat for making said heater effective or ineffective so that the system operates to maintain either a low or a high temperature.

3. In a heating system, a radiator, a valve to govern the supply of heating medium thereto, a thermostat to control said valve, an electric heater adjacent the thermostat, a source of current supply, a rheostat in circuit with the heater and source of current supply, and a switch for short circuiting the rheostat.

4. In combination with a valve, electrically operated means for controlling said valve comprising a relay and a mercury column thermostat which closes a circuit, short-circuiting the relay, an electric heater positioned adjacent the thermostat to deliver heat thereto, and a rheostat for controlling the current supply to the heater.

5. In combination with a valve, electrically operated means for controlling said valve comprising a relay and a mercury column thermostat which closes a circuit, short-circuiting the relay, an electric heater arranged adjacent the thermostat, a rheostat for controlling the current supply to the heater, and a switch for short-circuiting the rheostat.

6. In a heating system for a railway car having an air train pipe thereon, a radiator, a valve to control the inflow of heating medium through the radiator, and electrically operated means for controlling the valve, comprising a circuit making and breaking thermostat, an electric heater arranged adjacent said thermostat, a rheostat in circuit with the heater, a switch adapted to short-circuit the rheostat and means operated by changes of pressure in said air train pipe for opening and closing said switch.

7. The method of adjusting the operating temperatures of a thermostatically controlled apparatus which consists in continuously applying a constant but regulatable temperature correction in the immediate vicinity of the controlling element of the apparatus which element is at the same time responsive to temperature changes in the space being heated subject to the continuously applied correction.

8. The method of adjusting the operating temperatures of a thermostatically controlled apparatus which consists in continuously applying a constant but regulatable quantity of heat to the controlling thermostat of the system, which theremostat is at the same time responsive to temperature changes in the space being heated.

9. In thermostatically controlled apparatus, the combination of a controlling thermostat which is exposed to temperature changes in the space being heated and is responsive to said changes, and means for continuously applying a constant but regulatable temperature correction in the immediate vicinity of the thermostat.

10. In thermostatically controlled apparatus, the combination of a controlling thermostat which is exposed to temperature changes in the space being heated and is responsive to said changes, and means operating independently of the thermostat for continuously applying additional heat in constant but regulatable quantities to the thermostat.

11. In thermostatically controlled apparatus, the combination of a controlling thermostat which is exposed to temperature changes in the space being heated and is responsive to said changes, an auxiliary heater arranged adjacent to the thermostat for delivering additional heat thereto, and means independent of the thermostat for regulating the amount of heat continuously delivered by the heater.

12. In thermostatically controlled apparatus, the combination of a controlling thermostat which is exposed to temperature changes in the space being heated and is responsive to said changes, an electric heater positioned adjacent the thermostat for delivering auxiliary heat thereto, and means independent of the thermostat and including a rheostat to control the current continuously supplied to the heater.

PAUL B. PARKS.